(12) United States Patent
Coudurier

(10) Patent No.: US 9,307,261 B2
(45) Date of Patent: Apr. 5, 2016

(54) SPLICING OF VIDEO FOR PARALLEL ENCODING

(75) Inventor: Baptiste Coudurier, Los Angeles, CA (US)

(73) Assignee: HULU, LLC, Santa Monica, CA (US)

(*) Notice: Subject to any disclaimer, the term of this patent is extended or adjusted under 35 U.S.C. 154(b) by 825 days.

(21) Appl. No.: 13/584,065

(22) Filed: Aug. 13, 2012

(65) Prior Publication Data

US 2014/0044198 A1    Feb. 13, 2014

(51) Int. Cl.
*H04N 7/12*     (2006.01)
*H04N 19/436*   (2014.01)

(52) U.S. Cl.
CPC ................... *H04N 19/436* (2014.11)

(58) Field of Classification Search
CPC .................................................... H04N 19/436
USPC ..................................................... 375/240.26
See application file for complete search history.

(56) References Cited

U.S. PATENT DOCUMENTS

| | | | | |
|---|---|---|---|---|
| 6,339,617 B1* | 1/2002 | Ueda | ............... | H04N 19/503 |
| | | | | 348/699 |
| 7,522,667 B2* | 4/2009 | Gould | ............... | H04N 21/434 |
| | | | | 375/240.26 |
| 7,610,205 B2* | 10/2009 | Crockett | ............... | G10L 21/04 |
| | | | | 704/200.1 |
| 2005/0094965 A1* | 5/2005 | Chen | ............... | H04N 21/23424 |
| | | | | 386/278 |
| 2011/0069757 A1* | 3/2011 | Ammu | ............... | H04N 19/006 |
| | | | | 375/240.12 |
| 2012/0147958 A1* | 6/2012 | Ronca | ............... | H04N 19/00521 |
| | | | | 375/240.16 |

* cited by examiner

*Primary Examiner* — Jessica M Prince
(74) *Attorney, Agent, or Firm* — Fountainhead Law Group PC

(57) ABSTRACT

In one embodiment, a method receives a video at a partial encoder. The partial encoder determines characteristics of the video by performing a portion of an encoding process of the video. The method analyzes the characteristics of the video to determine splice points in the video to splice the video into multiple parts. The video is spliced into a plurality of parts based on the splice points and the plurality of parts are sent to a plurality of encoders. The plurality of encoders encode the plurality of parts substantially in parallel, the encoded plurality of parts are combined to form an encoded version of the video, and the partial encoder does not encode any of the encoded plurality of parts in the encoded version of the video.

19 Claims, 4 Drawing Sheets

SPLICING OF VIDEO FOR PARALLEL ENCODING

BACKGROUND

Media programs, including audio-video data, are increasingly distributed over telecommunications networks for the viewing and enjoyment of users. Services provide media programs to users through various video delivery technologies (e.g., streaming). For example, the service may allow a user to view the latest television shows or movies through a web portal using a media player. After a television show airs, the service may experience a high demand for the television show. In one example, a media program provider provides the television show to the service. The service then needs to transcode the television show before the service can make the television show available to the users. For example, the television show may need to be transcoded into different bitrates. Due to the popularity of the video, the service would like to transcode the media program as fast as possible. However, if the transcoding is performed by one encoder, the service must wait until the encoder finishes transcoding the entire television show to before making the television show available to users.

One way of transcoding the media program faster is to splice the media program into multiple parts and transcode the media program using multiple encoders. Thus, the encoding can be performed in parallel and the encoded parts from the encoders are combined into a file. Typically, the splicing of the media program into multiple parts is performed based on time. For example, the media program may be spliced every 5 seconds. This may encode the media program faster, but the splicing may not be optimal because encoding a picture of video depends on other parts of the video. For example, motion estimation and motion compensation leverage the use of already encoded pictures, such as reference pictures. If arbitrary splices are used, then one part of video that is sent to one encoder may not be optimal because references pictures that should be encoded with pictures of that part may have been sent to another encoder.

SUMMARY

In one embodiment, a method receives a video at a partial encoder. The partial encoder determines characteristics of the video by performing a portion of an encoding process of the video. The method analyzes the characteristics of the video to determine splice points in the video to splice the video into multiple parts. The video is spliced into a plurality of parts based on the splice points and the plurality of parts are sent to a plurality of encoders. The plurality of encoders encode the plurality of parts substantially in parallel, the encoded plurality of parts are combined to form an encoded version of the video, and the partial encoder does not encode any of the encoded plurality of parts in the encoded version of the video.

In one embodiment, a non-transitory computer-readable storage medium is provided containing instructions, that when executed, control a computer system to be configured for: receiving a video at a partial encoder; determining, by the partial encoder, characteristics of the video, the characteristics determined by performing a portion of an encoding process of the video; analyzing the characteristics of the video to determine splice points in the video to splice the video into multiple parts; splicing the video into a plurality of parts based on the splice points; and sending the plurality of parts to a plurality of encoders, wherein: the plurality of encoders encode the plurality of parts substantially in parallel, the encoded plurality of parts are combined to form an encoded version of the video, and the partial encoder does not encode any of the encoded plurality of parts in the encoded version of the video.

In one embodiment, an apparatus is provided comprising: one or more computer processors; and a computer-readable storage medium comprising instructions, that when executed, control the one or more computer processors to be configured for: receiving a video; determining characteristics of the video, the characteristics determined by performing a portion of an encoding process of the video; analyzing the characteristics of the video to determine splice points in the video to splice the video into multiple parts; splicing the video into a plurality of parts based on the splice points; and sending the plurality of parts to a plurality of encoders, wherein: the plurality of encoders encode the plurality of parts substantially in parallel, the encoded plurality of parts are combined to form an encoded version of the video, and the determining of the characteristics does not encode any of the encoded plurality of parts in the encoded version of the video.

The following detailed description and accompanying drawings provide a better understanding of the nature and advantages of particular embodiments.

DETAILED DESCRIPTION

Described herein are techniques for an encoding system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
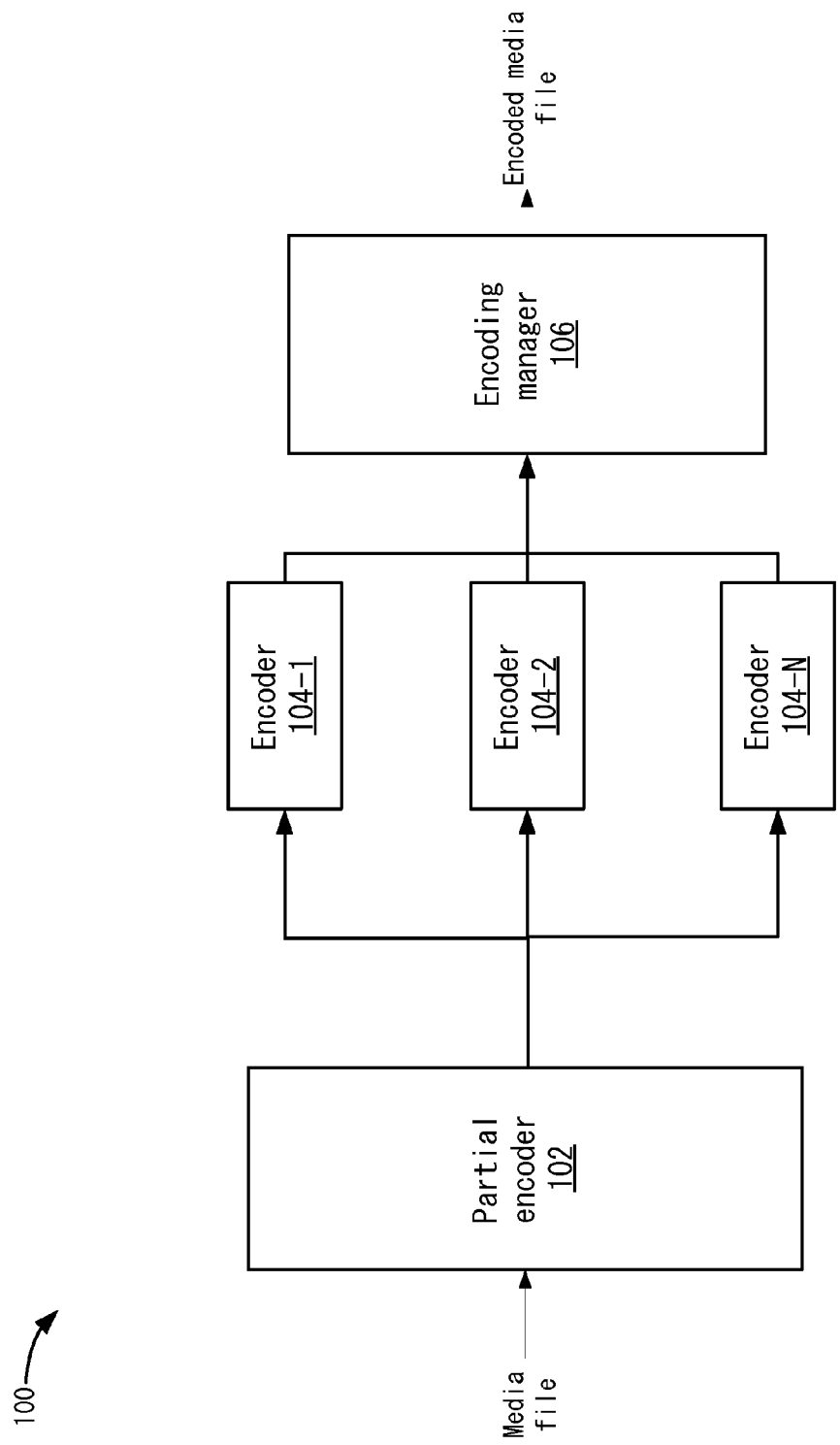
FIG. 1 depicts a simplified system for encoding a media program according to one embodiment.

FIG. 1 depicts a simplified system 100 for encoding a media program according to one embodiment. As discussed above, a service may provide media programs to users. In one example, it is desirable to have media programs available to the users as fast as possible. However, the media program needs to be encoded, sometimes into multiple bitrates, before it can be made available for viewing, such as on the website. Thus, particular embodiments provide parallel encoding of the media program. To more efficiently encode the media program, particular embodiments analyze the video of the media program to determine splice points that are optimal and use the splice points to split the video into multiple parts. The multiple parts can then be encoded in parallel. The encoded parts are then combined into a file.

A partial encoder 102 receives a media file for a media program. The media file includes video that needs to be encoded. Partial encoder 102 analyzes the video to determine splice points and additional metadata that may be used in encoding the video. However, partial encoder 102 may not perform encoding of the video. Rather, partial encoder 102 may perform operations that may be a portion of an encoding process to determine splice points where the video is spliced. For example, as will be described in more detail below, partial encoder 102 analyzes differences in pictures of the video to determine where to splice the video. For example, partial encoder 102 determines a sum of squared differences or sum of absolute differences for pictures of the video.

The splice points that partial encoder 102 determines are then used to splice the video into multiple parts. The multiple parts can then be encoded in parallel by encoders 104-1, 104-2, . . . , 104-N. Encoders 104 receive different parts of the video and encode each part separately. The encoding may be performed in parallel, which may speed up the encoding process as compared to encoding the entire video in series with an encoder.

Encoders 104 may also receive metadata that was determined by partial encoder 102. For example, because partial encoder 102 performed a part of the encoding process, encoders 104 may not need to perform this process again. For example, part of the encoding process (e.g., in motion estimation and motion compensation) is to determine differences between pictures of the media program. Encoders 104 may not need to determine these differences again. Rather, encoders 104 use the differences determined by partial encoder 102 to make encoding decisions during the encoding process.

When finished encoding each part, encoders 104 output the encoded part to an encoding manager 106. Encoding manager 106 can then assemble the encoded parts into a media file. For example, the encoded parts may be merged into one file. Encoding manager 106 then outputs the file. The above process may be repeated to encode the video into multiple bitrates.

Figure 2:
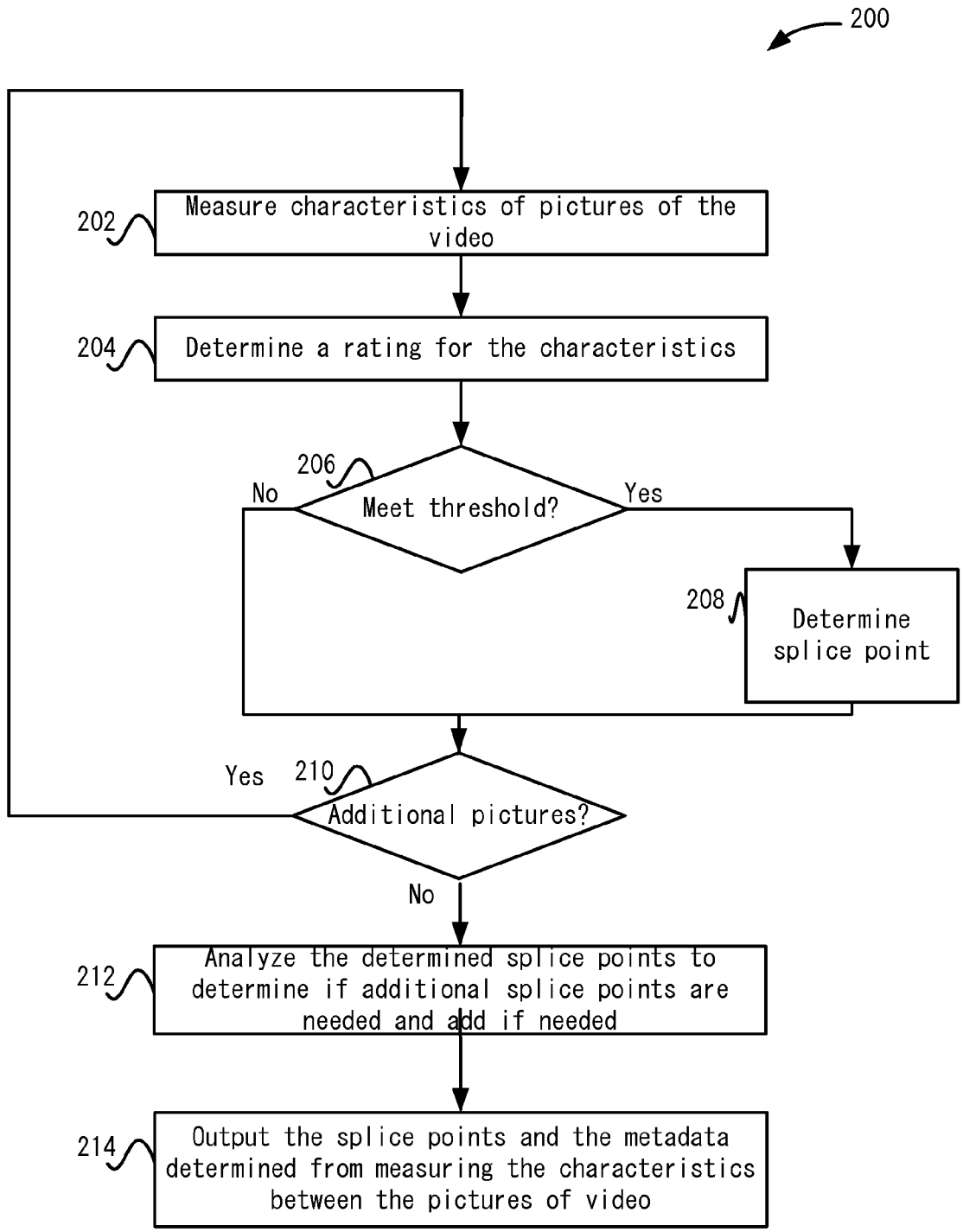
FIG. 2 depicts a simplified flowchart of a method for determining splice points according to one embodiment.

FIG. 2 depicts a simplified flowchart 200 of a method for determining splice points according to one embodiment. At 202, partial encoder 102 measures characteristics of pictures of the video. A picture may be a unit of video content. Other units of video content may also be appreciated or referred to, such as frames, blocks, etc. The characteristics that are measured may include differences between pictures in the video. For example, when an object is moving, differences result in pictures due to the movement.

The differences may be reflected by movement of objects in the video. The differences may be measured because it may be desirable to have a splice point when many differences result. For example, during a scene change, there may be many differences as the scene changes from one setting to another setting. This may be a good point to have a splice point because an encoding process may not be able to leverage many similarities in the pictures because of the differences. Thus, the two parts that are formed by the splice point may be sent to different encoders 104. However, if many differences do not result between two pictures, then this point may not be a good splice point because an encoding process may exploit the similarities between the two pictures. For example, in an encoding process, the differences between the similar pictures are encoded and sent. This improves compression of the video and makes the encoding process more efficient. Thus, it is desirable to encode similar pictures together. However, the efficiency is not as affected when the splice point is between pictures with large differences because not as many similarities can be exploited.

At 204, partial encoder 102 determines a rating for the characteristics. For example, depending on the amount of differences between the pictures, a rating may be determined, such as pictures with a higher difference are rated higher than pictures with a lower difference. Other characteristics may be taken into account when determining the rating.

At 206, partial encoder 102 determines if the rating meets a threshold. The threshold is used to determine if splice points should be inserted in the video. For example, if the rating meets the threshold, then at 208, partial encoder 102 determines that a splice point should be inserted between the pictures of the media program. In this case, this may indicate the differences between the units of video are enough that it makes sense to put a splice point between the pictures.

If the threshold is not met, or after a splice point is determined, at 210, partial encoder 102 determines if additional pictures should be processed. If so, the process reiterates to 202 to measure additional characteristics between other pictures of the video. For example, partial encoder 102 may sequentially analyze pictures of the video. Also, the analysis may be performed using multiple pictures, such as more than two pictures may be analyzed or differences from non-consecutive pictures may be determined If there are no more pictures to process, at 212, partial encoder 102 analyzes the determined splice points to determine if additional splice points are needed. For example, the splice points may result in parts that may be longer than desired. For example, a scene may be long and thus the part is longer than desired. In this case, additional splice points may be inserted to reduce the length of some parts. If the additional splice points are not added, then some parts of the video may be sent to encoders 104 that are much longer than others, which may increase the encoding time because some encoders 104 may take longer than other encoders to encode their parts of video.

When the entire video has been analyzed, at 214, partial encoder 102 outputs the splice points and the metadata determined from measuring the characteristics between the pictures of video. For example, partial encoder 102 outputs the splice points and metadata to encoders 104. Also, the splice points and metadata can be output to a scheduler that schedules the encoding of the video.

Figure 3:
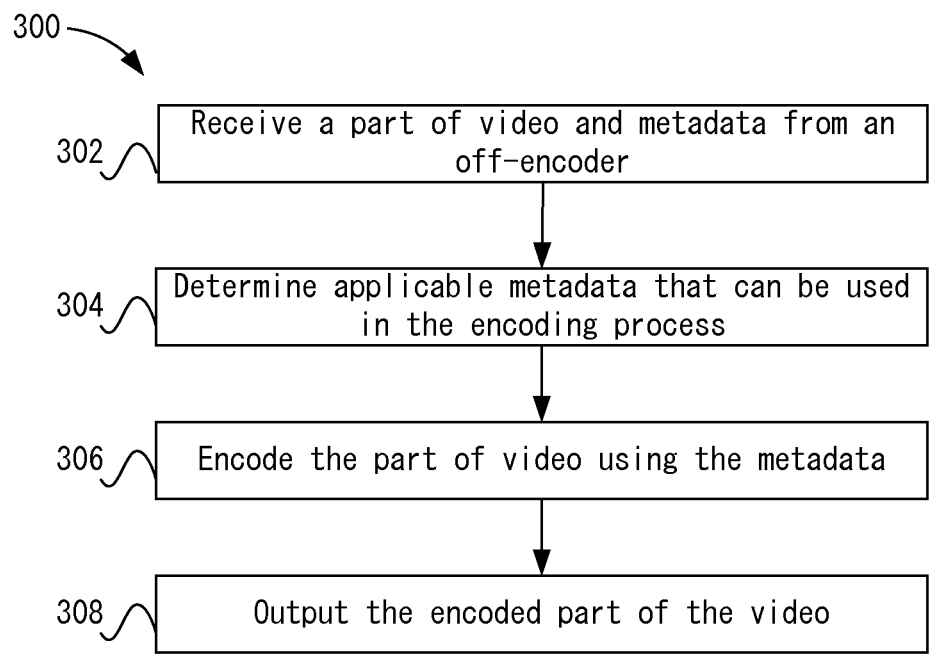
FIG. 3 depicts a simplified flowchart of a method for encoding the multiple parts of video in parallel according to one embodiment.

FIG. 3 depicts a simplified flowchart 300 of a method for encoding the multiple parts of video in parallel according to one embodiment. At 302, an encoder 104 receives a part of video and metadata from partial encoder 102. For example, encoder 104 receives only the part of video that encoder 104 is to encode. The other parts of video are sent to other encoders 104 and the present encoder 104 does not have knowledge of what information is in the other parts. Thus, the encoding process is performed solely on the part of video that is received.

At 304, encoder 104 determines applicable metadata that can be used in the encoding process. For example, the encoding process may need to determine the differences between units of video that are being encoded for motion compensation or motion estimation. Because these differences have been computed before by partial encoder 102, encoder 104 does not need to perform these calculations again.

At 306, encoder 104 encodes the part of video using the metadata. Encoder 104 may make different decisions in encoding the part of the video by using the metadata. For example, if partial encoder 102 performs motion estimation, encoder 104 may use the motion estimation decision during the encoding process. In this case, partial encoder 102 may save the motion estimation decision. Encoders 102 would then retrieve applicable motion estimation decisions when encoding the parts of the video. For example, for a unit of video that is being encoded, the motion estimation decision that was determined by partial encoder 102 is used by encoder 102 instead of making the motion estimation decision again.

At 308, encoder 104 outputs the encoded part of the video. Encoding manager 106 then receives the encoded parts of video from multiple encoders 104 and combines the multiple parts into one file. Each part may be identified and encoding manager 106 combines the parts into the correct input sequence.

Figure 4:
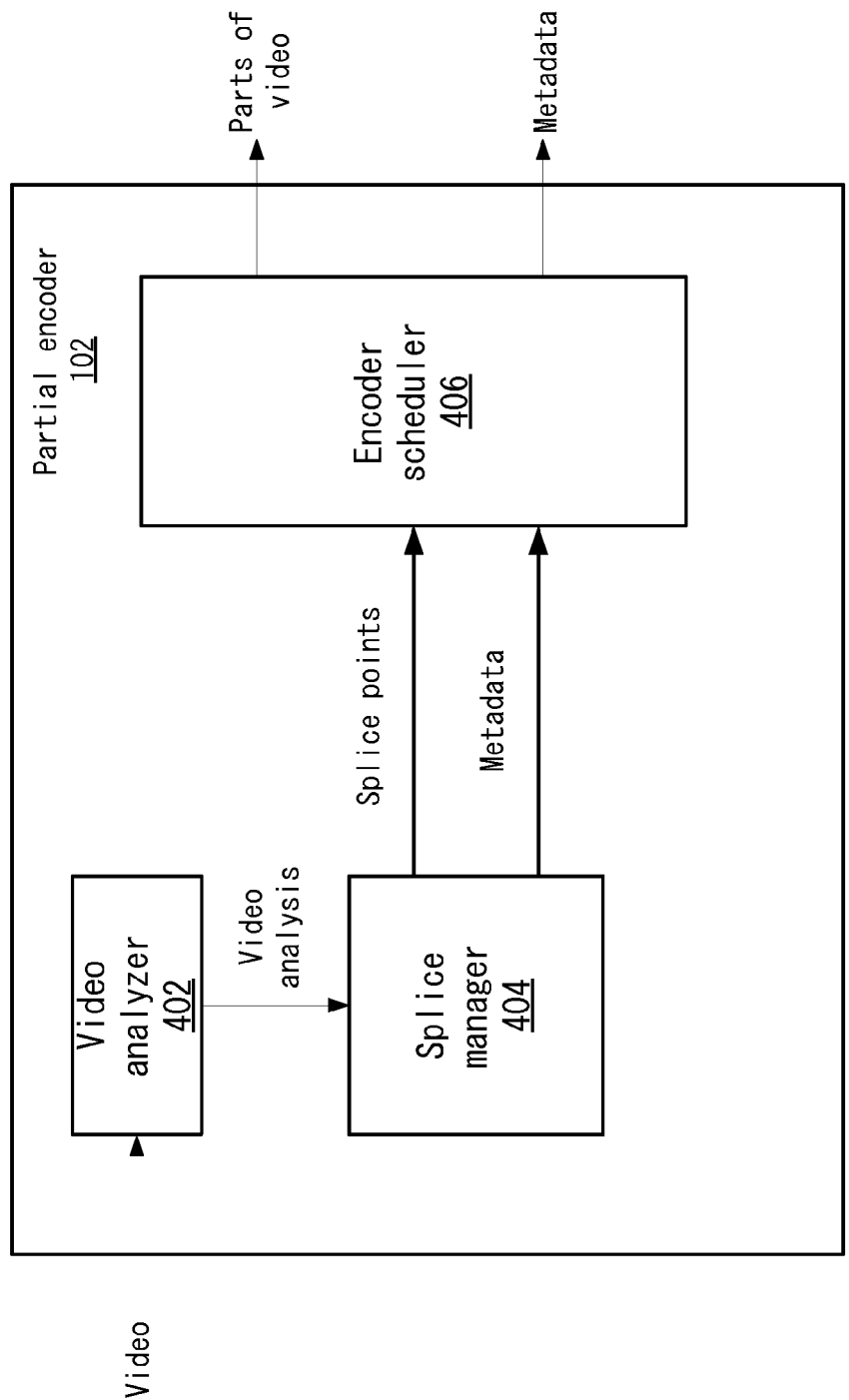
FIG. 4 depicts a more detailed example of a partial encoder according to one embodiment.

FIG. 4 depicts a more detailed example of partial encoder 102 according to one embodiment. A video analyzer 402 receives the video. Video analyzer 402 can then analyze the characteristics of the video as discussed above. For example, video analyzer 402 may be an encoder where only a part of the encoder is used. For example, the differences are measured by the encoder, but encoding of the video is not performed. In one example, the encoder is only programmed to determine the differences between pictures of the video.

Video analyzer 402 then outputs the characteristics of the video to a splice manager 404. Splice manager 404 then determines where splice points should be determined For example, splice manager 404 may determine ratings for the differences determined and determine whether a splice point should be inserted between pictures of the video. Splice manager 404 outputs the splice points and metadata. For example, the metadata may be the characteristics that were determined by video analyzer 402 or any analysis by splice manager 404, such as the ratings.

An encoder scheduler 406 then splits the video into multiple parts and schedules the encoding of the multiple parts on encoders 104. Encoder scheduler 406 may also determine applicable metadata for each part of video and send the applicable metadata with each part to each encoder 104. In other embodiments, the entire set of metadata may be sent to each encoder 104.

Accordingly, partial encoder 102 is used to analyze characteristics of the video before a parallel encoding process. This optimizes the splice points of the video. Thus, the multiple parts of video that are sent to different encoders 104 may be encoded more efficiently and also faster.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving a video at a partial encoder, the partial encoder programmed to only perform a portion of an encoding process of the video;
   determining, by the partial encoder, characteristics of the video to determine differences between the pictures in the video, the characteristics determined by performing the portion of the encoding process of the video;
   analyzing the differences between pictures in the video to determine ratings for a plurality of potential splice points in the video;
   comparing the ratings between pictures to a threshold;
   selecting splice points from a subset of the plurality of potential splice points based on the comparing, wherein a splice point is selected when a rating between pictures meets the threshold;
   splicing the video into a plurality of parts based on the splice points; and
   sending the plurality of parts to a plurality of encoders, wherein:
   the plurality of encoders encode the plurality of parts substantially in parallel,
   the encoded plurality of parts are combined to form an encoded version of the video, and
   the partial encoder does not encode any of the encoded plurality of parts in the encoded version of the video.

2. The method of claim 1, wherein:
   the plurality of encoders include a first encoder and a second encoder,
   the first encoder encodes a first part in the plurality of parts and the second encoder encode a second part in the plurality of parts, and
   the first part and the second part are different parts of the video.

3. The method of claim 2, wherein:
   the first encoder does not have knowledge of information in the second part to use in encoding the first part, and
   the second encoder does not have knowledge of information in the first part to use in encoding the second part.

4. The method of claim 1, wherein each part in the plurality of parts is sent to a separate encoder to encode each part in parallel.

5. The method of claim 1, wherein analyzing the differences between pictures in the video comprises:
   determining where a possible scene change occurs in the video; and
   adding a potential splice point at the scene change.

6. The method of claim 1, further comprising:
   determining additional splice points not found in the selected splice points; and
   adding the additional splice points.

7. The method of claim 1, wherein:
   the threshold comprises a first threshold, and
   the additional splice points not found in the selected splice points are determined when parts are longer than a second threshold.

8. The method of claim 1, wherein the plurality of encoders use the characteristics determined by the partial encoder to encode the plurality of parts.

9. A non-transitory computer-readable storage medium containing instructions, that when executed, control a computer system to be configured for:
   receiving a video at a partial encoder, the partial encoder programmed to only perform a portion of an encoding process of the video;
   determining, by the partial encoder, characteristics of the video to determine differences between pictures in the video, the characteristics determined by performing the portion of the encoding process of the video;
   analyzing the differences between pictures in the video to determine ratings for a plurality of potential splice points in the video;
   comparing the ratings between pictures to a threshold;

selecting splice points from a subset of the plurality of potential splice points based on the comparing, wherein a splice point is selected when a rating between pictures meets the threshold;

splicing the video into a plurality of parts based on the splice points; and sending the plurality of parts to a plurality of encoders, wherein:

the plurality of encoders encode the plurality of parts substantially in parallel, the encoded plurality of parts are combined to form an encoded version of the video, and the partial encoder does not encode any of the encoded plurality of parts in the encoded version of the video.

10. The non-transitory computer-readable storage medium of claim 9, wherein:

the plurality of encoders include a first encoder and a second encoder, the first encoder encodes a first part in the plurality of parts and the second encoder encode a second part in the plurality of parts, and the first part and the second part are different parts of the video.

11. The non-transitory computer-readable storage medium of claim 10, wherein:

the first encoder does not have knowledge of information in the second part to use in encoding the first part, and the second encoder does not have knowledge of information in the first part to use in encoding the second part.

12. The non-transitory computer-readable storage medium of claim 9, wherein each part in the plurality of parts is sent to a separate encoder to encode each part in parallel.

13. The non-transitory computer-readable storage medium of claim 9, wherein analyzing the differences between pictures in the video comprises:

determining where a possible scene change occurs in the video; and dding a splice point at the scene change.

14. The non-transitory computer-readable storage medium of claim 9, wherein analyzing the characteristics of the video comprises:

determining differences between pictures in the video to determine the ratings;

comparing the ratings between pictures to a threshold; and selecting a splice point when a rating between pictures is greater than the threshold.

15. The non-transitory computer-readable storage medium of claim 9, further configured for:

determining additional splice points not found in the selected splice points; and adding the additional splice points.

16. The non-transitory computer-readable storage medium of claim 9, wherein the additional splice points not found in the selected splice points are determined when parts are longer than a threshold.

17. The non-transitory computer-readable storage medium of claim 9, wherein the plurality of encoders use the characteristics determined by the partial encoder to encode the plurality of parts.

18. An apparatus comprising:

one or more computer processors; and a computer-readable storage medium comprising instructions, that when executed, control the one or more computer processors to be configured for:

receiving a video at a partial encoder, the partial encoder programmed to only perform a portion of an encoding process of the video;

determining, by the partial encoder, characteristics of the video to determine differences between pictures in the video, the characteristics determined by performing the portion of the encoding process of the video;

analyzing the differences between pictures in the video to determine ratings for a plurality of potential splice points in the video;

comparing the ratings between pictures to a threshold;

selecting splice points from a subset of the plurality of potential splice points based on the comparing wherein a splice point is selected when a rating between pictures meets the threshold;

splicing the video into a plurality of parts based on the splice points; and sending the plurality of parts to a plurality of encoders, wherein:

the plurality of encoders encode the plurality of parts substantially in parallel, the encoded plurality of parts are combined to form an encoded version of the video, and the partial encoder does not encode any of the encoded plurality of parts in the encoded version of the video.

19. The apparatus of claim 18, wherein:

the plurality of encoders include a first encoder and a second encoder, the first encoder encodes a first part in the plurality of parts and the second encoder encode a second part in the plurality of parts, the first part and the second part are different parts of the video, the first encoder does not have knowledge of information in the second part to use in encoding the first part, and the second encoder does not have knowledge of information in the first part to use in encoding the second part.

* * * * *

UNITED STATES PATENT AND TRADEMARK OFFICE
CERTIFICATE OF CORRECTION

PATENT NO. : 9,307,261 B2
APPLICATION NO. : 13/584065
DATED : April 5, 2016
INVENTOR(S) : Baptiste Coudurier It is certified that error appears in the above-identified patent and that said Letters Patent is hereby corrected as shown below:

In the Claims

In column 7, claim 10, line 20, please delete "encode" and insert --encodes--.

In column 7, claim 13, line 38, please delete "dding" and insert --adding--.

In column 8, claim 19, line 44, please delete "encode" and insert --encodes--.

Signed and Sealed this
Fourteenth Day of June, 2016

Michelle K. Lee
*Director of the United States Patent and Trademark Office*